United States Patent
Scipio et al.

(10) Patent No.: US 10,247,110 B2
(45) Date of Patent: Apr. 2, 2019

(54) METHOD AND SYSTEM FOR RELIABLE GAS TO LIQUID TRANSFER

(71) Applicant: General Electric Company, Schenectady, NY (US)

(72) Inventors: Alston I. Scipio, Mableton, GA (US); David Terry Trayhan, Jr., Greenville, SC (US); Sanji Ekanayake, Mableton, GA (US); Paul Robert Fernandez, Woodstock, GA (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 798 days.

(21) Appl. No.: 14/862,374

(22) Filed: Sep. 23, 2015

(65) Prior Publication Data

US 2017/0082034 A1   Mar. 23, 2017

(51) Int. Cl.
*F02C 7/22* (2006.01)
*F02C 9/28* (2006.01)
(Continued)

(52) U.S. Cl.
CPC .............. *F02C 9/28* (2013.01); *F01D 25/32* (2013.01); *F02C 3/22* (2013.01); *F02C 3/24* (2013.01);
(Continued)

(58) Field of Classification Search
CPC .. F23K 5/18; F02C 7/22; F02C 7/2227; F23D 2209/30; F05B 2260/602
See application file for complete search history.

(56) References Cited

U.S. PATENT DOCUMENTS

| 3,878,678 A | * | 4/1975 | Huellmantel | F02C 9/28 60/39.281 |
| 4,476,675 A | * | 10/1984 | Aurousseau | F02C 9/26 60/39.281 |

(Continued)

FOREIGN PATENT DOCUMENTS

| EP | 0 955 457 A2 | 11/1999 |
| GB | 719996 A | 12/1954 |
| JP | 2008-136929 A | 6/2008 |

OTHER PUBLICATIONS

Extended European Search Report and Opinion issued in connection with corresponding EP Application No. 16190181.4 dated Feb. 15, 2017.

*Primary Examiner* — Gerald L Sung
*Assistant Examiner* — Marc Amar
(74) *Attorney, Agent, or Firm* — Dority & Manning, PA

(57) ABSTRACT

A method and system for transitioning a gas turbine from burning gaseous fuel to liquid fuel and purging the liquid fuel therefrom after transfer back to the gaseous fuel are disclosed herein. The method includes pressurizing a volume of liquid fuel in an accumulator with a first volume of motive gas. A valve is opened in response to low gaseous fuel pressure in the gas turbine to permit the volume of liquid fuel to flow through a conduit to the gas turbine. A volume of flushing medium is pressurized in the accumulator with a second volume of motive gas. The valve is opened to permit at least a portion of the volume of flushing medium to flow through the conduit to flush any of the volume of liquid fuel remaining in the conduit after the gas turbine consumes the volume of liquid fuel.

11 Claims, 7 Drawing Sheets

(51) Int. Cl.
    *F23K 5/18*         (2006.01)
    *F01D 25/32*      (2006.01)
    *F02C 3/22*         (2006.01)
    *F02C 3/24*         (2006.01)
    *F02C 7/232*       (2006.01)
    *F02C 9/40*         (2006.01)

(52) U.S. Cl.
    CPC .............. *F02C 7/22* (2013.01); *F02C 7/222* (2013.01); *F02C 7/232* (2013.01); *F02C 9/40* (2013.01); *F23K 5/18* (2013.01); *F05B 2260/602* (2013.01); *F05D 2260/602* (2013.01); *F05D 2270/301* (2013.01); *F23D 2209/30* (2013.01)

(56) References Cited

U.S. PATENT DOCUMENTS

| | | | |
|---|---|---|---|
| 5,490,387 A * | 2/1996 | Bisson | B64D 37/20 137/586 |
| 6,247,299 B1 * | 6/2001 | Buss | F02C 6/18 60/39.463 |
| 6,385,961 B2 * | 5/2002 | Nakamoto | F01D 25/002 60/39.094 |
| 8,783,007 B2 * | 7/2014 | Mestroni | F02C 7/22 431/3 |
| 9,103,285 B2 * | 8/2015 | Raju | F02C 7/2365 |
| 2001/0004828 A1 * | 6/2001 | Nakamoto | F01D 25/002 60/39.094 |
| 2006/0042701 A1 * | 3/2006 | Jansen | F16K 1/38 137/606 |
| 2008/0047275 A1 | 2/2008 | Ziminsky et al. | |
| 2009/0165435 A1 * | 7/2009 | Koranek | F23D 17/002 60/39.463 |
| 2011/0271679 A1 * | 11/2011 | Mestroni | F02C 7/22 60/734 |
| 2012/0167545 A1 * | 7/2012 | Raju | F02C 7/2365 60/39.53 |
| 2013/0199576 A1 * | 8/2013 | Poole | F23K 5/18 134/22.12 |
| 2014/0096827 A1 * | 4/2014 | Scipio | F02C 9/40 137/1 |
| 2015/0360252 A1 * | 12/2015 | Werkheiser | B05B 15/557 427/446 |
| 2016/0177878 A1 * | 6/2016 | Montagne | F02C 7/057 60/779 |

* cited by examiner

METHOD AND SYSTEM FOR RELIABLE GAS TO LIQUID TRANSFER

FIELD OF THE INVENTION

The present subject matter relates to a gas turbine. More particularly, the present subject matter relates to a method and system for transitioning a gas turbine from burning gaseous fuel to liquid fuel and purging the liquid fuel from the system after transfer back to the gaseous fuel.

BACKGROUND OF THE INVENTION

Gas turbines are used globally for power generation and various process applications. A gas turbine generally includes a compressor section, a combustion section, a turbine section, and an exhaust section. The compressor section progressively increases the pressure of a working fluid entering the gas turbine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a shaft connected to a generator, thereby producing electricity. The combustion gases then exit the gas turbine via the exhaust section.

One of the primary advantages of a gas turbine is the ability to run on a variety of fuels. For example, gas turbines may burn heavy fuel oils, naphtha, distillate, flare gas, syngas, landfill gas, and natural gas. This is particularly advantageous in parts of the world that suffer from normal and seasonal shortages of various fuels or have an abundance of multiple different fuel types. As a result, many power plant owners operate gas turbines capable of burning multiple fuel combinations. For example, some gas turbines burn natural gas as a primary fuel and diesel or distillate as a backup fuel. Preferably, the gas turbine is able to automatically transfer between fuel types.

In order to facilitate automatic fuel transfer, some gas turbines include methods and systems implementable on short notice to facilitate a fuel change (e.g., from natural gas to diesel) while maintaining a high percentage of base power output. The standard approach rapidly reduces the load on the gas turbine to some predetermined value based on a valid determination that there will be a loss of or substantial reduction in natural gas pressure, while simultaneously transferring to and ramping up the backup fuel supply. This process requires purging and prefilling of the backup system and reducing the primary fuel flow by closing the main supply valve or gas control valve (GCV).

The success of the traditional response is dependent on the rate of decay of the primary fuel pressure and the time to vent and prime the backup fuel supply system. Rapid activation and transition to the full operation of the backup fuel supply system strains the gas turbine components and control system. The need to maintain power output while the gas turbine experiences fuel system, combustion system, and power generation transients further complicates the process.

Although known transfer processes are generally successful, system reliability issues may arise. In systems using diesel as the backup fuel, residual liquid fuel in the supply lines hardens into coke deposits after switching back to gaseous fuel and operating continuously thereon for about five days. These coke deposits may reduce overall supply line diameter. Additionally, coke formation hinders the proper functioning of spring-operated check valves and three-way valves and may even clog critical fuel system components (e.g., distributor valves, fuel flow check valves, fuel lines, etc.). Furthermore, coke formation in the liquid fuel lines leading to the combustion cans may reduce the probability of a successful transfer back to liquid fuel.

The prior art generally includes two type systems that seek to mitigate the coking problem, but each system has drawbacks. Liquid fuel recirculating systems continually recirculate liquid fuel back to a supply tank, thereby preventing fuel stagnation in a portion of the supply lines. But, the recirculation occurs upstream of the distribution valves, check valves, and other components. As such, these components may still suffer from coking Nitrogen purge systems use nitrogen gas to blow out residual liquid fuel in the supply lines. Although these types of systems are generally effective, they require that the gas turbine stop for the liquid fuel system purge before operating on gaseous fuel, thereby impacting plant availability. Furthermore, both types of prior art systems are capital intensive and may negatively impact production efficiency throughout the operating year. Moreover, both systems may be ineffective in areas of the world where gaseous fuel supplies are sporadic or where no additional downtime to clean system components after a failed transfer or restart is available.

Accordingly, a method and system for permitting a gas turbine to quickly transition from operating on gaseous fuel to liquid fuel and for purging the liquid fuel supply lines after transitioning back to gaseous fuel would be useful in the art.

BRIEF DESCRIPTION OF THE INVENTION

Aspects and advantages of the invention are set forth below in the following description, or may be obvious from the description, or may be learned through practice of the invention.

In one aspect, the present subject matter is directed to a system for transferring the type of fuel supplied to a gas turbine. The system includes an accumulator for alternatively storing a first combination comprising a volume of liquid fuel and a first volume of motive gas and a second combination comprising a volume of flushing medium and a second volume of motive gas. The first volume of motive gas exerts pressure on the volume of liquid fuel, and the second volume of motive gas exerts pressure on the volume of flushing medium. A conduit couples the accumulator to a gas turbine. A motive gas source provides the first volume of motive gas and the second volume of motive gas to the accumulator. A valve opens in response to low gaseous fuel pressure in the gas turbine to permit the volume of liquid fuel to flow through the conduit to the gas turbine. The valve also opens to permit at least a portion of the volume of flushing medium to flow through the conduit to flush any of the volume of liquid fuel remaining in the conduit after the entire volume of liquid fuel has been consumed by the gas turbine.

Another aspect of the present subject matter is directed to an alternate embodiment of a system for transferring the type of fuel supplied to a gas turbine. The alternate embodiment includes a first accumulator for storing a volume of liquid fuel and a first volume of motive gas. The first volume of motive gas exerts pressure on the volume of liquid fuel. A first conduit couples the first accumulator to a gas turbine. A second accumulator stores a volume of flushing medium and a second volume of motive gas. The second volume of motive gas exerts pressure on the volume of flushing medium. A second conduit couples the second accumulator to the first conduit. A motive gas source provides the first volume of motive gas and the second volume of motive gas to the first and the second accumulators, respectively. A first valve opens in response to low gaseous fuel pressure in the gas turbine to permit the volume of liquid fuel to flow from the first accumulator through the first conduit to the gas turbine. A second valve in the second conduit permits at least a portion of the volume of flushing medium to flow through the first conduit to flush any of the volume of liquid fuel remaining in the first conduit after the entire volume of liquid fuel has been consumed by the gas turbine.

In a further aspect, the present subject matter includes a method of transferring the type of fuel supplied to a gas turbine. The method includes pressurizing a volume of liquid fuel in an accumulator with a first volume of motive gas. A valve opens in response to low gaseous fuel pressure in the gas turbine to permit the volume of liquid fuel to flow from the accumulator through a conduit to the gas turbine. A volume of flushing medium is pressurized in the accumulator with a second volume of motive gas. The valve opens to permit at least a portion of the volume of flushing medium to flow through the conduit to flush any of the volume of liquid fuel remaining in the conduit after the gas turbine engine consumes the volume of liquid fuel.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
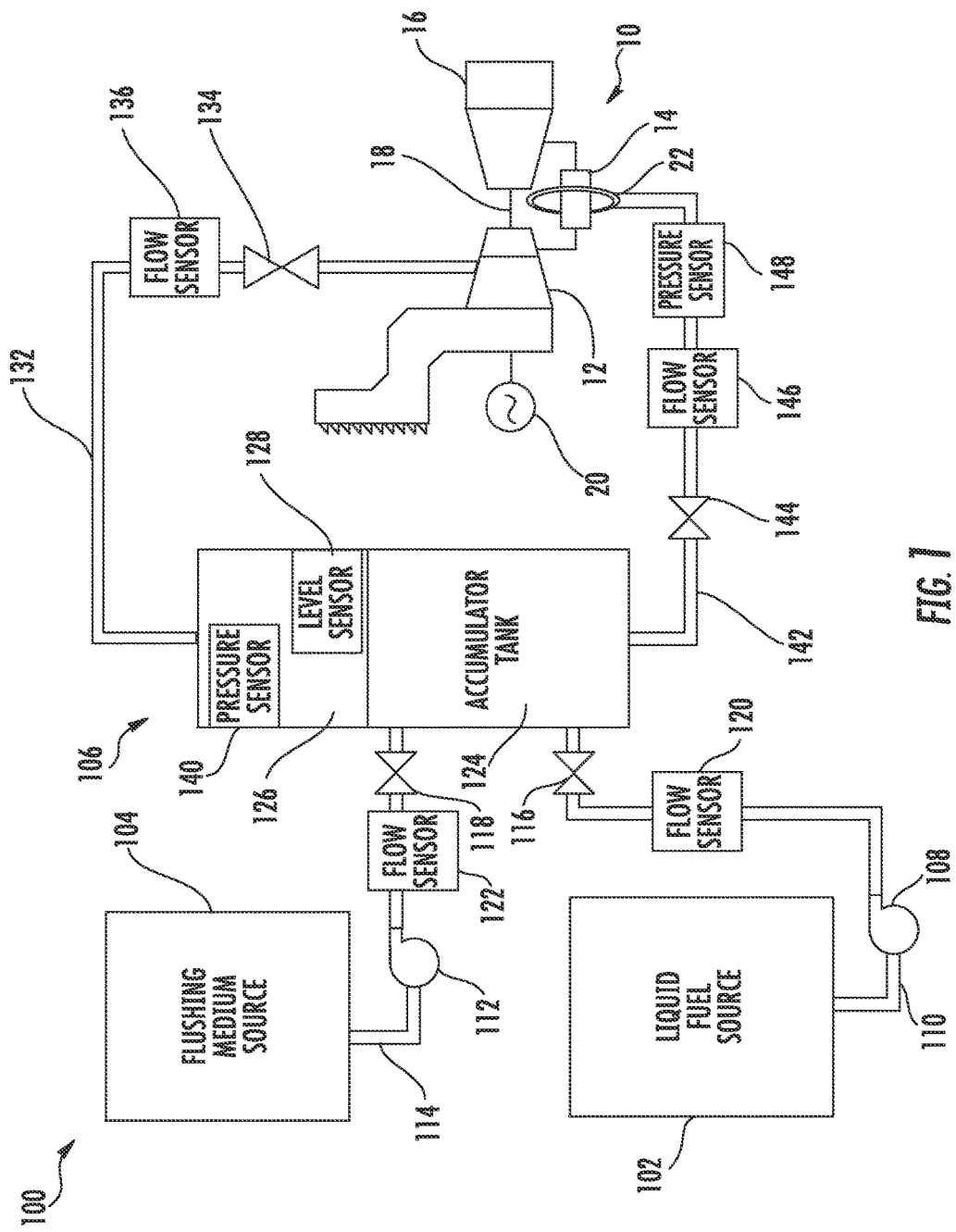
FIG. 1 is a schematic view of one embodiment of a system for transitioning a gas turbine from burning gaseous fuel to liquid fuel and purging the liquid fuel from the system after transfer back to the gaseous fuel in accordance with the embodiments disclosed herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present subject matter disclosed herein relates to systems and methods for transitioning a gas turbine from burning gaseous fuel to liquid fuel and purging the liquid fuel from the system after transfer back to the gaseous fuel. More specifically, the systems and methods provide liquid fuel to the gas turbine temporarily while the gas turbine transitions from a gaseous fuel source to a long-term liquid fuel source. That is, the systems and method provide a volume of liquid fuel to sustain the gas turbine while one or more pumps in the long-term liquid fuel start up to provide a long-term supply of liquid fuel. Furthermore, the systems and methods provided herein purge any residual fuel in the liquid fuel lines after use to prevent coke deposits from forming therein.

Now referring to the drawings, wherein identical numerals indicate the same elements throughout the figures, FIG. 1 schematically illustrates a gas turbine system 10. It should be understood that the turbine system 10 of the present disclosure need not be a gas turbine system 10, but rather may be any suitable turbine system, such as a steam turbine system or other suitable system. The gas turbine system 10 may include a compressor 12, a combustor 14, and a turbine 16. The compressor 12 and turbine 16 may be coupled by a shaft 18. The shaft 18 may be a single shaft or a plurality of shaft segments coupled together to form shaft 18.

As is generally known in the art, the compressor 12 compresses air or another suitable working fluid flowing therethrough. The compressed working fluid flows to the combustor 14, where it is mixed with fuel and combusted to create high temperature and high pressure combustion gases. The combustion gases exit the combustor 14 and flow into the turbine 16, which extracts kinetic energy from the combustion gases to drive the shaft 18. For example, rotation of the shaft 18 may drive the compressor 12, which compresses the working fluid. Alternately or in addition, the shaft 18 may connect the turbine 16 to a generator 20 for producing electricity.

The gas turbine 10 may be capable of operating on two or different types of fuels. For example, the gas turbine 10 may be able to burn two or more of the following fuels: heavy fuel oils, naphtha, distillate, flare gas, syngas, landfill gas, and natural gas. In one embodiment, the gas turbine 10 primarily operates on a gaseous fuel (e.g., natural gas), but also be able to burn a liquid fuel (e.g., diesel) when the gaseous fuel is unavailable. In this respect, the gas turbine 10 may include a gaseous fuel manifold (not shown) and a liquid fuel manifold 22 for respectively supplying gaseous fuel and liquid fuel to the combustor 14. Although the embodiment shown in FIG.1 uses a gaseous fuel as the primary fuel and a liquid fuel as the secondary fuel, the primary fuel and the secondary fuel may be either gaseous or liquid. In some embodiments, the gas turbine 10 may include a water injection manifold 24 for injecting water into the combustor 14 to maintain flame stability therein.

FIG. 1 also illustrates one embodiment of a system 100 for transitioning the gas turbine 10 from burning gaseous fuel to liquid fuel and purging the residual liquid fuel from the system 100 after transfer back to the gaseous fuel. The system 100 includes a liquid fuel source 102 and a flushing medium source 104 for respectively providing liquid fuel and a flushing medium (e.g., demineralized water) to an accumulator tank 106. The liquid fuel source 102 and the flushing medium source 104 are preferably tanks, but may be a pipe line or any other suitable source. A liquid fuel pump 108 pumps liquid fuel from the liquid fuel source 102 through a liquid fuel conduit 110 to the accumulator tank 106. Similarly, a flushing medium pump 112 pumps flushing medium from the flushing medium source 104 through a flushing medium conduit 114 to the accumulator tank 106. A liquid fuel conduit valve 116 controls the flow of liquid fuel through the liquid fuel conduit 110, and a flushing medium conduit valve 118 controls the flow of flushing medium through the flushing medium conduit 114. The liquid fuel conduit 110 and the flushing medium conduit 114 may optionally include a liquid fuel conduit pressure sensor 120 and/or a flushing medium sensor 122, respectively.

The accumulator tank 106 stores a volume of liquid 124 and a volume of motive gas 126 (e.g., pressurized air), which pressurizes the volume of liquid 124. As will be discussed in greater detail later, the volume of motive gas 126 forces the volume of liquid 124 out of the accumulator tank 106. In the embodiment illustrated in FIG. 1, the volume of liquid 124 is alternately liquid fuel or flushing medium. That is, the volume of liquid 124 is either liquid fuel or flushing medium depending on the progress of the fuel transition, but not both at the same time. In this respect, the flushing medium conduit valve 118 remains closed when the volume of liquid 124 is liquid fuel, and the liquid fuel conduit valve 116 remains closed when the volume of liquid 124 is flushing medium.

Figure 2:
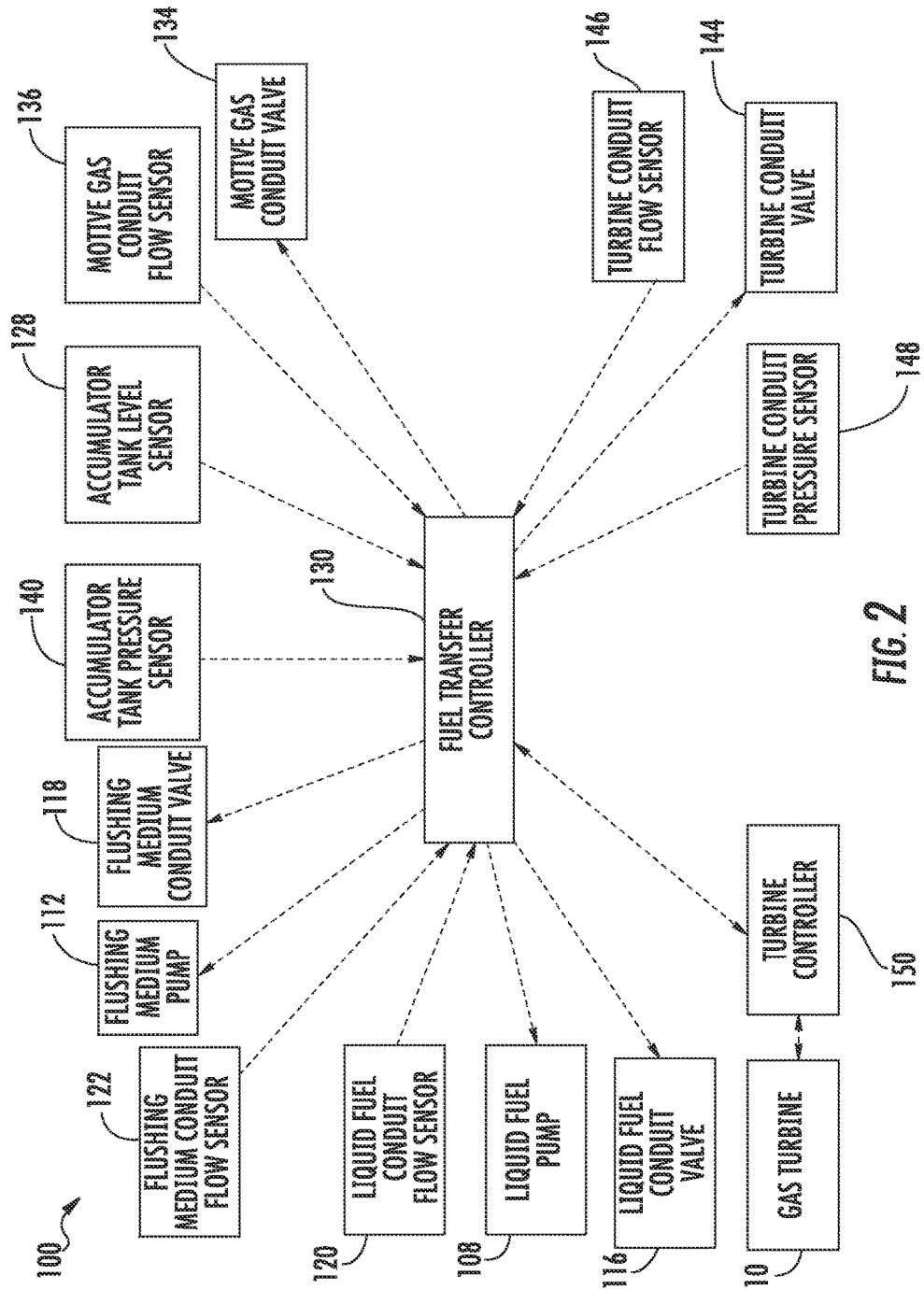
FIG. 2 is another schematic view of the system shown in FIG. 1, further illustrating a controller in communication with the various components of the system.

The accumulator tank 106 may include an accumulator tank level sensor 128 for measuring the measuring the level or height of the volume of liquid 124 therein. As illustrated in FIG. 2, the accumulator tank level sensor 128 communicates with a fuel transfer controller 130. In this respect, the fuel transfer controller 130 may modulate the liquid fuel pump 108, flushing medium pump 112, liquid fuel conduit valve 116, and flushing medium conduit valve 118 to maintain the proper level of the volume of liquid 124 in the accumulator tank 106 based on feedback from the accumulator tank level sensor 128 and, if included, the liquid fuel conduit and flushing medium conduit flow sensors 120, 122.

Figure 3:
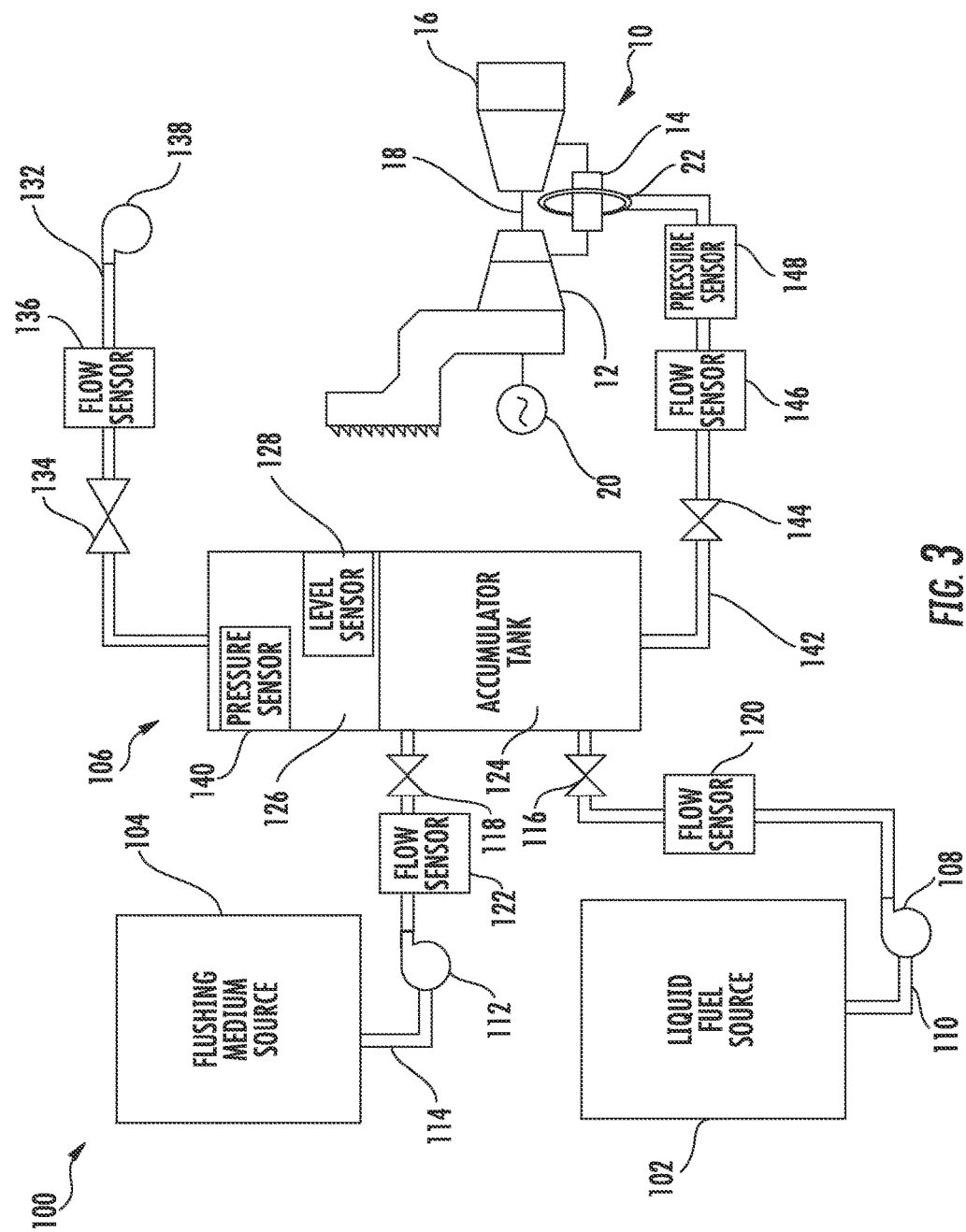
FIG. 3 is a schematic view of an alternate embodiment of the system shown in FIG. 1, illustrating a stand-alone pump for supplying motive gas.

The system 100 includes a motive gas conduit 132 for supplying motive gas to the accumulator tank 106. The motive gas conduit 132 includes a motive gas conduit valve 134 for controlling the flow of motive gas to the accumulator tank 106. Optionally, the motive gas conduit 132 may include a motive gas conduit flow sensor 136. In the embodiment illustrated in FIG. 1, the motive gas flowing through the motive gas conduit 132 may be pressurized bled air from the compressor 12. As illustrated in FIG. 3, an alternate embodiment of the system 100' may include a stand-alone motive gas pump 138 to provide pressurized air to the motive gas conduit 132. The stand-alone motive gas pump 136 is a separate and distinct component from the gas turbine 10.

The accumulator tank 106 may include an accumulator tank pressure sensor 140 (FIG. 1) for measuring the pressure of the volume of motive gas 126 therein. As illustrated in FIG. 2, the accumulator tank pressure sensor 140 communicates with the fuel transfer controller 130. In this respect, the fuel transfer controller 130 may modulate the motive gas conduit valve 134 and/or the motive gas pump 138 to maintain the proper pressure of the volume of motive gas 126 in the accumulator tank 106 based on feedback from the accumulator tank pressure sensor 140 and, if included, the motive gas conduit flow sensor 136.

The system 100 further includes a turbine conduit 142 for supplying the volume of liquid 124 (i.e., liquid fuel or flushing medium) to the gas turbine 10, and more specifically to the liquid fuel manifold 22, for combustion thereof. The turbine conduit 142 includes a turbine conduit valve 144, which controls the flow of the volume of liquid 124 into the turbine conduit 142. That is, the turbine conduit valve 144 permits the volume of liquid 124 to flow to the liquid fuel manifold 22 when open and prevents the volume of liquid 124 from flowing to the liquid fuel manifold 22 when closed. The turbine conduit 142 may optionally include a turbine conduit flow sensor 146 and/or a turbine conduit pressure sensor 148.

Figure 4:
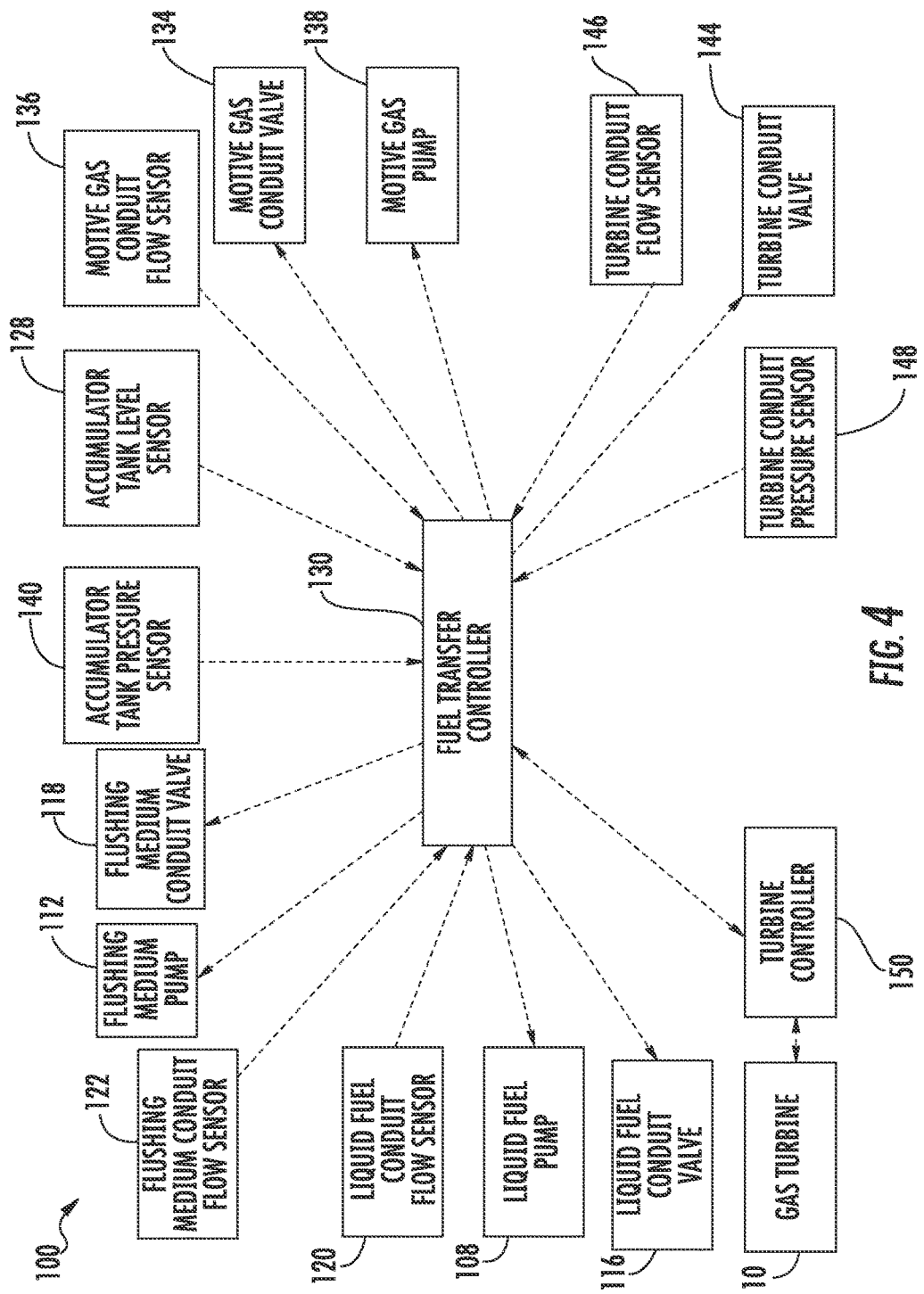
FIG. 4 is another schematic view of the embodiment of the system shown in FIG. 3, further illustrating the controller in communication with the various components of the system.

As illustrated in FIG. 2, the fuel transfer controller 130 communicates with a turbine controller 150, which controls the gas turbine 10. The turbine controller 150 monitors, inter alia, the pressure of the gaseous fuel supplied to the gas turbine 10. As long as the gaseous fuel pressure is sufficient and the transfer is not manually initiated, the fuel transfer controller 130 keeps the turbine conduit valve 144 closed. If the fuel transfer is manually initiated or the turbine controller 150 determines that the gaseous fuel pressure is too low or decaying at a predetermined rate due to the loss of gas compression, the fuel transfer controller 130 opens the turbine conduit valve 144, thereby permitting the volume of liquid 124 (in this case liquid fuel) to flow to the liquid fuel manifold 22. That is, the fuel source transfer may occur manually based on user input or automatically based on fuel pressure. In the embodiment illustrated in FIGS. 2 and 4, the fuel transfer controller 130 and the turbine controller 150 are separate controllers. Although, the fuel transfer controller 130 may be integrated into the turbine controller 150.

In further alternate embodiment, a system 100" includes separate accumulator tanks for the liquid fuel and the flushing medium. In this respect, the liquid fuel source 102 supplies liquid fuel to a liquid fuel accumulator tank 106a, and the flushing medium source 104 supplies flushing medium to a flushing medium accumulator tank 106b. The liquid fuel conduit 110 and the flushing medium conduit 114 respectively supply liquid fuel and flushing medium to the liquid fuel and flushing medium accumulator tanks 106a, 106b in the same manner as in systems 100, 100'. The liquid fuel accumulator tank 106a stores a volume of liquid fuel 124a and a first volume of motive gas 126a, which pressurizes the volume of liquid fuel 124a. The flushing medium accumulator tank 106b stores a volume of flushing medium 124b and a second volume of motive gas 126b, which pressurizes the volume of flushing medium 124b. As will be discussed in greater detail later, the first and second volumes of motive gas 126a, 126b respectively force the volume of liquid fuel 124a and the volume of flushing medium 124b out of the liquid fuel and flushing medium accumulator tanks 106a, 106b.

Figure 6:
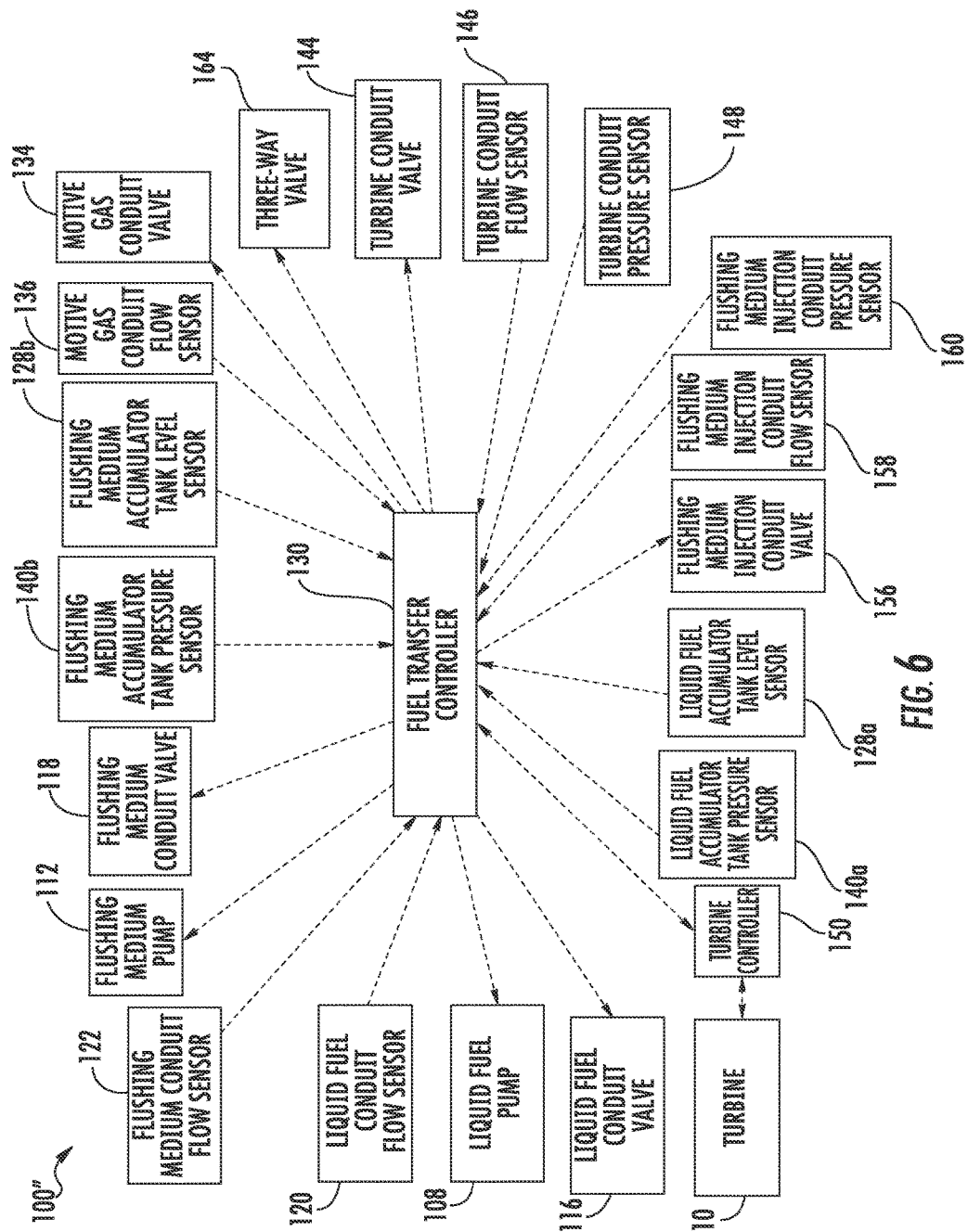
FIG. 6 is another schematic view of the embodiment of the system shown in FIG. 5, further illustrating the controller in communication with the various components of the system.

The liquid fuel and flushing medium accumulator tanks 106a, 106b may respectively include a liquid fuel accumulator tank level sensor 128a and a flushing medium accumulator tank level sensor 128b for respectively measuring the level or height of the volume of liquid fuel 124a and the volume of flushing medium 124b therein. As illustrated in FIG. 6, the fuel transfer controller 130 may independently modulate the liquid fuel pump 108, flushing medium pump 112, liquid fuel conduit valve 116, and flushing medium conduit valve 118 to maintain the proper level of the volume of liquid fuel 124a and the volume of flushing medium 124b in the same manner as in system 100, 100'.

The system 100" may supply motive gas to the liquid fuel and flushing medium accumulator tanks 106a, 106b through the motive gas conduit 132 in the same manner as in the systems 100, 100'. The motive gas conduit 132 splits into a liquid fuel accumulator tank branch 132a and a flushing medium accumulator tank branch 132b. In one embodiment, the motive gas conduit valve 134 is upstream of the branches 132a, 132b. In this respect, motive gas flows into the liquid fuel and flushing medium accumulator tanks 106a, 106b at the same time, in the same flow rate, and at the same pressure. Alternately, the branches 132a, 132b may optionally include valves (not shown) for independently adjusting the timing, flow rate, or pressure of the motive gas delivered to the liquid fuel and flushing medium accumulator tanks 106a, 106b.

The liquid fuel and flushing medium accumulator tanks 106a, 106b may respectively include a liquid fuel accumulator tank pressure sensor 140a and a flushing medium accumulator tank pressure sensor 140b for respectively measuring the pressure of the first and the second volumes of motive gas 126a, 126b therein. As illustrated in FIG. 6, the fuel transfer controller 130 may independently modulate the motive gas conduit valve 134, the motive gas pump 138, and/or any other valves to maintain the proper pressure of the volume of motive gas 126 in the accumulator tank 106 in the same manner as in the systems 100, 100'.

The turbine conduit 142 supplies the volume of liquid fuel 124a from the liquid fuel accumulator tank 106a to the liquid fuel manifold 22 for combustion thereof in the same manner as the systems 100, 100'. In the embodiment illustrated in FIG. 5, the turbine conduit 142 includes a check valve 152 disposed upstream of the turbine conduit valve 144. The check valve 152 prevents liquid in the turbine conduit 142 from flowing in the reverse direction back into the liquid fuel accumulator tank 106a.

The system 100" further includes a flushing medium injection conduit 154 for supplying the volume of flushing medium 124b to the gas turbine 10, and more specifically to the water injection manifold 24. The flushing medium injection conduit 154 includes a flushing medium injection conduit valve 156, which controls the flow of the volume of flushing medium 124b exiting the flushing medium accumulator tank 106b. The flushing medium injection conduit 154 may optionally include a flushing medium injection conduit flow sensor 158 and/or a flushing medium injection conduit pressure sensor 160.

A transfer conduit 162 fluidly couples the turbine conduit 142 and the flushing medium injection conduit 154. In this respect, the transfer conduit 162 permits at least a portion of the volume of flushing medium 124b to flow into the turbine conduit 142 to the liquid fuel manifold 22. In particular, the transfer conduit 162 connects to the turbine conduit 142 downstream of the check valve 152 and upstream of the turbine conduit valve 144. In this respect, the check valve 152 prevents the flushing medium from flowing into the liquid fuel accumulator tank 106a, and the turbine conduit valve 144 controls the flow of flushing medium to the liquid fuel manifold 22. The transfer conduit 162 connects to a three-way valve 164 disposed in the flushing medium injection conduit 154 downstream of the flushing medium injection conduit valve 156. The three-way valve 164 controls the destination of the volume of flushing medium 124b leaving the flushing medium accumulator tank 106b. More specifically, the three-way valve 164 directs the volume of flushing medium 124b to the water injection manifold 24 by blocking access to the transfer conduit 162. Analogously, the three-way valve 164 directs the volume of flushing medium 124b to the liquid fuel manifold 22 by opening access to the transfer conduit 162 and blocking access to the portion of the flushing medium injection conduit 154 downstream of the three-way valve 164. As illustrated in FIG. 6, the fuel transfer controller 130 may control the operation of the three-way valve 164.

The liquid fuel conduit valve 116, the flushing medium conduit valve 118, the motive gas conduit valve 134, the turbine conduit valve 144, and flushing medium injection conduit valve 154 may be globe valves, gate valves, butterfly valves, ball valves, or any other type of valve. The three-way valve 164 may be an electrically controlled solenoid valve or any other type of three-way valve. The valves 116, 118, 134, 144, 154, 164 in the systems 100, 100', 100" may be electrically controlled via the fuel transfer controller 130 or the turbine controller 150. Alternately, the valves 116, 118, 134, 144, 154, 164 may be manually controlled.

As used herein, the fuel transfer controller 130 may comprise any combination of microprocessors, circuitry, or other programmed logic circuit and is not limited to any particular hardware architecture or configuration. Embodiments of the systems and methods set forth herein may be implemented by one or more general-purpose or customized controllers 130 adapted in any suitable manner to provide the desired functionality. The controller 130 may be adapted to provide additional functionality, either complementary or unrelated to the present subject matter. For instance, one or more controllers 130 may be adapted to provide the described functionality by accessing software instructions rendered in a computer-readable form. When software is used, any suitable programming, scripting, or other type of language or combinations of languages may be used to implement the teachings contained herein. Nevertheless, software need not be used exclusively, or at all. For example, as will be understood by those of ordinary skill in the art without required additional detailed discussion, some embodiments of the systems and methods set forth and disclosed herein may also be implemented by hard-wired logic or other circuitry, including, but not limited to application-specific circuits. Of course, various combinations of computer-executed software and hard-wired logic or other circuitry may be suitable, as well.

Figure 5:
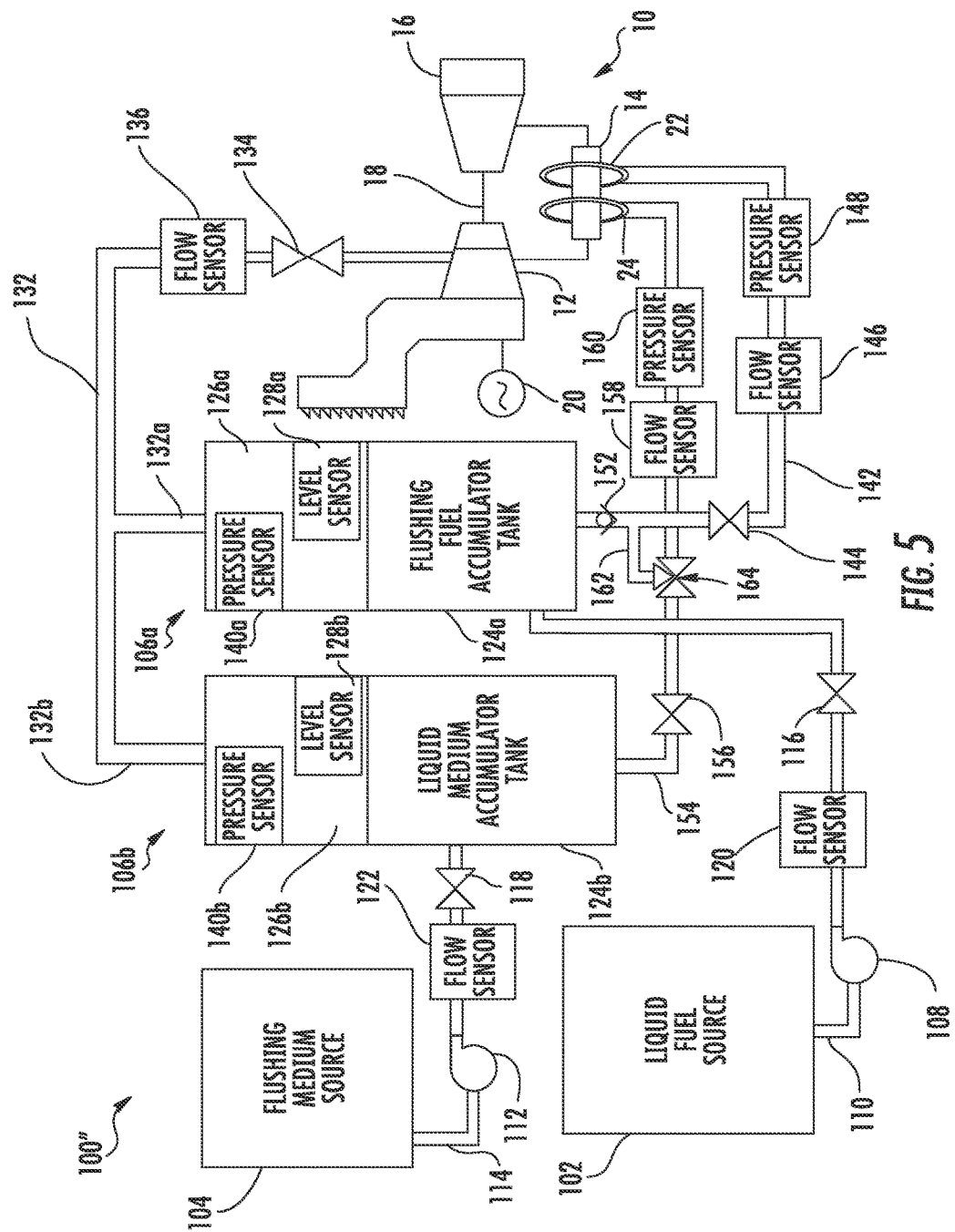
FIG. 5 is a schematic view of a further alternate embodiment of the system shown in FIG. 1, illustrating a flushing medium accumulator tank and a liquid fuel accumulator tank.
Figure 7:
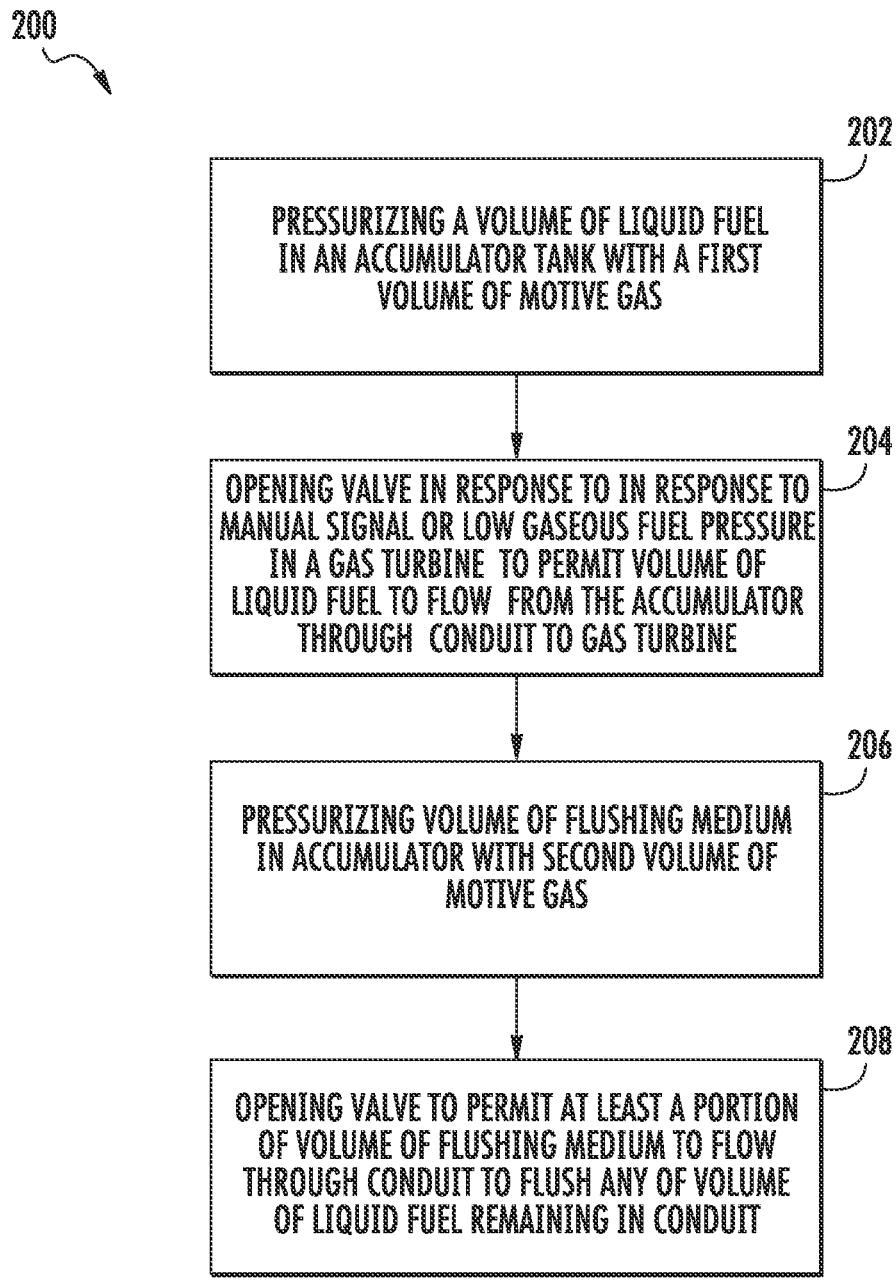
FIG. 7 is a flowchart illustrating an example of a method for transitioning a gas turbine from burning gaseous fuel to liquid fuel and purging the liquid fuel from the system after transfer back to the gaseous fuel in accordance with the embodiments disclosed herein.

FIG. 7 is a flowchart illustrating an exemplary method (200) for transitioning the gas turbine 10 from burning gaseous fuel to liquid fuel and purging the liquid fuel from the systems 100, 100', 100" after transfer back to the gaseous fuel. In step (202), the volume of motive gas 126, 126a pressurizes the volume of liquid fuel 124a in the accumulator tank 106 (FIGS. 1 and 3) or liquid fuel accumulator tank 106a (FIG. 5). In accordance with step (202), the liquid fuel pump 108 may pump a volume of liquid fuel 124a from the liquid fuel source 102 into the accumulator tank 106 (FIGS. 1 and 3) or liquid fuel accumulator tank 106a (FIG. 5). The accumulator tank level sensor 128 (FIGS. 1 and 3) or the liquid fuel accumulator tank level sensor 128a (FIG. 5) may provide feedback to the fuel transfer controller 130, which modulates the liquid fuel pump 108 as needed to reach the desired level of the volume of liquid fuel 124a. The controller 130 may also modulate the motive gas conduit valve 134 and, if present, the motive gas pump 138 in response to feedback from the accumulator tank pressure sensor 140 (FIGS. 1 and 3) or liquid fuel accumulator tank pressure sensor 140a (FIG. 5) to maintain the desired pressure in the accumulator tank 106 (FIGS. 1 and 3) or the liquid fuel accumulator tank 106a (FIG. 5).

In step (204), the fuel transfer controller 130 opens the turbine conduit valve 144 in response to a manual signal to transfer fuel sources or low gaseous fuel pressure in the fuel supply system of the gas turbine 10. The fuel transfer controller 130 is communication with the turbine controller 150, which preferably monitors gaseous fuel pressure. In this respect, the pressure in the accumulator tank 106 (FIGS. 1 and 3) or the liquid fuel accumulator tank 106a (FIG. 5) created by the volume of motive gas 126, 126a forces the volume of liquid fuel 124a through the turbine conduit 142 for eventual delivery to the liquid manifold 22. After delivery of the volume of liquid fuel 124a to the liquid fuel manifold 22, the fuel transfer controller 130 closes the turbine conduit valve 144.

In the embodiment illustrated in FIG. 5, the fuel transfer controller 130 may optionally open the flushing medium injection conduit valve 156 if the flushing medium accumulator tank 106b has been filled with the volume of flushing medium 124b in accordance with step (206), discussed below. In this respect, the flushing medium injection conduit valve 156 permits a portion of the volume of the flushing medium 124b to flow to the water injection manifold 24. This may be advantageous when the flushing medium, e.g., demineralized water, is used for flame stabilization in the combustor 14. The three-way valve 164 should be positioned to block flow to the transfer conduit 162. After delivery of the volume of liquid fuel 124a to the liquid fuel manifold 22, the fuel transfer controller 130 switches the position of the three-way valve 164 to open the transfer conduit 162 and block the downstream portion of the flushing medium injection conduit 154.

In step (206), the volume of motive gas 126, 126b pressurizes the volume of flushing medium 124b in the accumulator tank 106 (FIGS. 1 and 3) or flushing medium accumulator tank 106b (FIG. 5). In accordance with step (206), the flushing medium pump 112 may pump the volume of flushing medium 124b from the flushing medium source 104 into the accumulator tank 106 (FIGS. 1 and 3) or flushing medium accumulator tank 106b (FIG. 5). The accumulator tank level sensor 128 (FIGS. 1 and 3) or the flushing medium accumulator tank level sensor 128b (FIG. 5) provide feedback to the fuel transfer controller 130, which may modulate the flushing medium pump 112 as needed to reach the desired level of the volume of flushing medium 124b. The controller 130 may also modulate the motive gas conduit valve 134 and, if present, the motive gas pump 138 in response to feedback from the accumulator tank pressure sensor 140 (FIGS. 1 and 3) or flushing medium accumulator tank pressure sensor 140b (FIG. 5) to maintain the desired pressure in the accumulator tank 106 (FIGS. 1 and 3) or the flushing medium accumulator tank 106b (FIG. 5). With respect to the system 100" (FIG. 5), step (206) may be done before, during, or after step (202).

In step (208), at least a portion of the volume of flushing medium 124b flows through the turbine conduit 142 after the entire volume of liquid fuel was burned, thereby flushing any residual liquid fuel therefrom. In particular, the step (208) may occur after the gas turbine 10 has switched back to operating the primary fuel. In the systems 100, 100' (FIGS. 1 and 3), the fuel transfer controller 130 opens the turbine conduit valve 144. In this respect, the pressure in the accumulator tank 106 created by the volume of motive gas 126 forces the volume of flushing medium 124b through the turbine conduit 142 for eventual delivery to the liquid manifold 22. In this respect, any residual liquid fuel is flushed from the turbine conduit 142. After delivery of the volume of flushing medium 124b to the liquid fuel manifold 22, the fuel transfer controller 130 closes the turbine conduit valve 144.

In the system 100", the fuel transfer controller 130 opens the flushing medium injection conduit valve 156. The pressure in the flushing medium accumulator tank 106b created by the volume of motive gas 126b forces the volume of flushing medium 124b into the flushing medium injection conduit 142. The three-way valve 164 directs the volume of flushing medium 124b in the transfer conduit 162, which directs the volume of flushing medium 124b to the turbine conduit 142. In this respect, any residual liquid fuel is flushed from the turbine conduit 142. After delivery of the volume of flushing medium 124b to the liquid fuel manifold 22, the fuel transfer controller 130 closes the flushing medium injection conduit valve 156.

After flushing the residual liquid fuel from the turbine conduit 142, the liquid fuel pump 108 may pump another volume of liquid fuel 124a from the liquid fuel source 102 into the accumulator tank 106 (FIGS. 1 and 3) or liquid fuel accumulator tank 106a (FIG. 5). Motive gas may then pressurize the volume of liquid fuel 124a. In system 100" (FIG.5), the flushing medium pump 112 may pump another volume of flushing medium 124b from the flushing medium source 104 into the flushing medium accumulator tank 106b. Motive gas may then pressurize the volume of flushing medium 124b.

In this respect, the systems 100, 100', 100" and the method (200) permits the gas turbine 10 to switch from a gaseous fuel (e.g., natural gas) to a liquid fuel (e.g., diesel) without requiring shut down thereof. In this respect, power plant availability and capacity are improved. Furthermore, the systems 100, 100', 100" and the method (200) purge any residual liquid fuel therefrom to prevent coke deposits from forming, thereby improving reliability and reducing failed fuel transfers. In fact, all valves and other components that supply liquid fuel to the gas turbine 10 are flushed. Moreover, the systems 100, 100', 100" and the method (200) are easily implementable on existing gas turbines.

It should be noted that, in some alternative implementations, the functions noted in the step may occur out of the order noted in the figures. For example, two steps shown in succession may, in fact, be executed concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed:

1. A fuel transfer system comprising:
    an accumulator tank for alternatively storing a first combination of a volume of liquid fuel and a first volume of motive gas and a second combination of a volume of flushing medium and a second volume of motive gas;
    a conduit for coupling the accumulator tank to a gas turbine;
    a motive gas source for providing the first volume of motive gas and the second volume of motive gas to the accumulator tank; and
    a valve that opens in response to low gaseous fuel pressure in the gas turbine to permit the volume of liquid fuel to flow through the conduit to the gas turbine and opens to permit at least a portion of the volume of flushing medium to flow through the conduit to flush any of the volume of liquid fuel remaining in the conduit after the volume of liquid fuel has been consumed by the gas turbine.

2. The fuel transfer system of claim 1, wherein the flushing medium is demineralized water and the liquid fuel is diesel.

3. The fuel transfer system of claim 1, wherein the motive gas source is a compressor of the gas turbine.

4. The fuel transfer system of claim 1, wherein the motive gas source is a pump separate from the gas turbine.

5. The fuel transfer system of claim 1, further comprising a controller that opens the valve in response to low gaseous fuel pressure in the gas turbine.

6. The fuel transfer system of claim 5, wherein the controller modulates a motive gas conduit valve in response to a pressure in the accumulator tank measured by a pressure sensor.

7. The fuel transfer system of claim 5, wherein the controller modulates the pump in response to a pressure in the accumulator tank measured by a pressure sensor.

8. A method for transferring fuel with a fuel transfer system having an accumulator tank for alternatively storing a first combination of a volume of liquid fuel and a first volume of motive gas and a second combination of a volume of flushing medium and a second volume of motive gas, the method comprising: pressurizing the volume of liquid fuel in the accumulator tank with the first volume of motive gas from a motive gas source;
    opening a valve in response to low gaseous fuel pressure in a gas turbine to permit the volume of liquid fuel to flow from the accumulator tank through a conduit to the gas turbine; pressurizing the volume of flushing medium in the accumulator tank with the second volume of motive gas from the motive gas source; and
    opening the valve to permit at least a portion of the volume of flushing medium to flow through the conduit to flush any of the volume of liquid fuel remaining in the conduit after the volume of liquid fuel has been consumed by the gas turbine.

9. The method of claim 8, further comprising closing the valve after the volume of flushing medium flows through the conduit to flush any of the volume of liquid fuel remaining in the conduit.

10. The method of claim 8, further comprising pressurizing a second volume of liquid fuel with a third volume of motive gas in the accumulator tank after closing the valve.

11. The method of claim 8, wherein the flushing medium is demineralized water.

* * * * *